US011040599B2

(12) United States Patent
Tanaka

(10) Patent No.: US 11,040,599 B2
(45) Date of Patent: Jun. 22, 2021

(54) AIR CONDITIONING DEVICE FOR A VEHICLE

(71) Applicant: Toyota Jidosha Kabushiki Kaisha, Toyota Aichi-ken (JP)

(72) Inventor: Yoko Tanaka, Toyota Aichi-ken (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 193 days.

(21) Appl. No.: 16/531,710

(22) Filed: Aug. 5, 2019

(65) Prior Publication Data

US 2020/0047590 A1 Feb. 13, 2020

(30) Foreign Application Priority Data

Aug. 8, 2018 (JP) .............................. JP2018-149131

(51) Int. Cl.
*B60H 1/24* (2006.01)
*B60H 1/34* (2006.01)
*B60H 1/00* (2006.01)

(52) U.S. Cl.
CPC ........... *B60H 1/242* (2013.01); *B60H 1/0055* (2013.01); *B60H 1/00564* (2013.01); *B60H 1/3407* (2013.01)

(58) Field of Classification Search
CPC .. B60H 1/242; B60H 1/3407; B60H 1/00564; B60H 1/0055; B60H 1/00557; B60H 2001/00214
See application file for complete search history.

(56) References Cited

U.S. PATENT DOCUMENTS

2016/0318372 A1* 11/2016 Kang ................. B60H 1/00742
2017/0008372 A1 1/2017 Kato et al.

FOREIGN PATENT DOCUMENTS

| JP | 2001260634 A | * | 9/2001 |
| JP | 2015-189258 A | | 11/2015 |
| JP | 2018-024308 A | | 2/2018 |
| KR | 20050010386 A | * | 1/2005 |

* cited by examiner

*Primary Examiner* — Jessica Yuen
(74) *Attorney, Agent, or Firm* — Dinsmore & Shohl LLP

(57) ABSTRACT

An air conditioning device for a vehicle includes a foot duct main body portion and a protruding portion. The foot duct main body portion extends in the vehicle width direction inside an instrument panel, and is formed in a substantially tubular shape, one length direction end portion of which is connected to an air conditioning device main body. Blowing apertures that open toward the vehicle lower side of a vehicle cabin interior are formed at each of another length direction end portion and a length direction intermediate portion of the foot duct main body portion. The protruding portion provided at a region of a vehicle upper sidewall portion of the foot duct main body portion corresponds with the blowing aperture formed at the length direction intermediate portion. The protruding portion protrudes toward an opening of this blowing aperture formed at the length direction intermediate portion.

7 Claims, 4 Drawing Sheets

AIR CONDITIONING DEVICE FOR A VEHICLE

CROSS-REFERENCE TO RELATED APPLICATION

This application claims priority under 35 USC § 119 from Japanese Patent application No. 2018-149131 filed on Aug. 8, 2018, the disclosure of which is incorporated by reference herein in its entirety.

BACKGROUND

Technical Field

The present disclosure relates to an air conditioning device for a vehicle.

Related Art

Japanese Patent Application Laid-Open (JP-A) No. 2015-189258 discloses an invention relating to an air blowing device. In the technology relating to JPA-A No. 2015-189258, in a structure that blows air out to a vehicle rear side from a blowing aperture provided in an upper face portion of an instrument panel, aperture edge portions structuring the blowing aperture are curved to the vehicle rear side toward a vehicle width direction outer side. In consequence, air blown from the blowing aperture converges toward a vehicle occupant sitting at the vehicle rear side of the instrument panel. Therefore, the blown air may be efficiently sent toward the vehicle occupant.

In the structure disclosed in JP-A No. 2015-189258, a single wide blowing aperture is provided at a duct. In contrast, in a structure in which a duct main body portion extends substantially in a vehicle width direction and plural blowing apertures that open toward a vehicle cabin side thereof in correspondence with control pedals are provided in the duct main body portion, such as a foot duct provided at a vehicle lower side of an instrument panel, air that flows substantially in the vehicle width direction along the interior of the duct main body portion is resistant to being blown out from a blowing aperture formed at a length direction intermediate portion of the duct main body portion (below referred to as art "intermediate blowing aperture"). Thus, the blown air may not be efficiently sent to a vehicle occupant from the respective blowing apertures; there is scope for improvement of the technology relating to JP-A No. 2015-189258 in this regard.

SUMMARY

The present disclosure provides an air conditioning device for a vehicle that may efficiently send air toward a vehicle occupant from an intermediate blowing aperture of a duct in which plural blowing apertures are provided.

Solution to Problem

A first aspect of the present disclosure is an air conditioning device for a vehicle including: a foot duct main body portion that extends substantially in a vehicle width direction at an interior of an instrument panel, the foot duct main body portion being formed in a substantially tubular shape, one length direction end portion of which is connected to an air conditioning device main body, and blowing apertures that open toward a vehicle lower side of an interior of a vehicle cabin being formed at each of another length direction end portion and a length direction intermediate portion of the foot duct main body portion; and a protruding portion provided at a region of a vehicle upper side wall portion of the foot duct main body portion, which region corresponds with a blowing aperture formed at the length direction intermediate portion of the foot duct main body portion, the protruding portion protruding toward an opening of the blowing aperture formed at the length direction intermediate portion.

According to this first aspect, the foot duct main body portion is provided inside the instrument panel. The foot duct main body portion extends substantially in the vehicle width direction and is formed in the substantially tubular shape. The one length direction end portion of the foot duct main body portion is connected to the air conditioning device main body. Respective blowing apertures are formed in the another length direction end portion and the length direction intermediate portion of the foot duct main body portion. The blowing apertures open toward the vehicle lower side of the vehicle cabin interior. The protruding portion is provided at the region of the vehicle upper side wall portion of the foot duct main body portion that corresponds with the intermediate blowing aperture. The protruding portion protrudes toward the opening of the intermediate blowing aperture. Consequently, a portion of air flowing inside the foot duct main body portion from the air conditioning device main body toward the another length direction end portion of the foot duct main body portion blows against the protruding portion, is guided by the protruding portion, and flows toward the opening of the intermediate blowing aperture. Thus, air may be efficiently sent from the intermediate blowing aperture to the vehicle cabin interior side thereof.

A second aspect of the present disclosure is an air conditioning device for a vehicle in which, in the first aspect described above, each of the blowing apertures is formed at a vehicle lower side end portion of a downward projecting portion that is projected toward a vehicle lower-rear side from the foot duct main body portion, the downward projecting portion being formed in a substantially tubular shape, an interior of which is in fluid communication with an interior of the foot duct main body portion.

According to this second aspect, each of the blowing apertures is formed in the end portion at the vehicle lower side of the corresponding downward projecting portion that is formed in a substantially tubular shape. The downward projecting portion is projected to the vehicle lower-rear side from the foot duct main body portion, and the interior of the downward projecting portion is in fluid communication with the interior of the foot duct main body portion. Thus, air flowing in the foot duct main body portion flows into the downward projecting portion, and this air is blown out from the blowing aperture along the direction of projection of the downward projecting portion toward the vehicle lower-rear side of the instrument panel. Therefore, if the blowing aperture is at a foot of a vehicle occupant sitting to the vehicle rear side of the instrument panel, a wind direction may be regulated so as to blow against vicinities of the ankle, the calf and the like.

A third aspect of the present disclosure is an air conditioning, device for a vehicle in which, in the first or second aspect described above, a knee airbag apparatus is provided at the interior of the instrument panel, a knee airbag that inflates and expands toward the vehicle lower side of the interior of the vehicle cabin being accommodated in the knee airbag apparatus; and the foot duct main body portion is disposed at a vehicle front side relative to the knee airbag apparatus.

According to this third aspect, the knee airbag apparatus accommodating the knee airbag that inflates and expands toward the vehicle lower side of the vehicle cabin interior is mounted inside the instrument panel. The foot duct main body portion is provided at the vehicle front side relative to the knee airbag apparatus. That is, the knee airbag apparatus may be provided at a location that is closer to a vehicle occupant. Consequently, a situation in which inflation and expansion of the knee airbag is impeded by the foot duct main body portion may be suppressed.

A fourth aspect of the present disclosure is an air conditioning device for a vehicle in which, in any one of the first to third aspects described above, the blowing apertures are disposed at a vehicle upper side of a control pedal and a footrest that are provided at a driver seat.

According to this fourth aspect, because the blowing apertures are disposed at the vehicle upper side of the control pedal and footrest provided at the driver seat, air may be sent effectively from the air conditioning device main body to the feet of a vehicle occupant during driving.

As described above, the air conditioning device for a vehicle according to the first aspect may efficiently send air toward a vehicle occupant from an intermediate blowing aperture of a duct in which plural blowing apertures are provided.

The air conditioning device for a vehicle according to the second aspect may improve comfort resulting from the air conditioning.

The air conditioning device for a vehicle according to the third aspect may improve safety at a time of vehicle collision.

The air conditioning device for a vehicle according to the fourth aspect may further improve comfort resulting from the air conditioning.

BRIEF DESCRIPTION OF THE DRAWINGS

Exemplary embodiments of the present disclosure will be described in detail based on the following figures, wherein.

DETAILED DESCRIPTION

Below, an exemplary embodiment of the air conditioning device for a vehicle according to the present disclosure is described using FIG. 1 to FIG. 4.
—Overall Structure—

Figure 1:
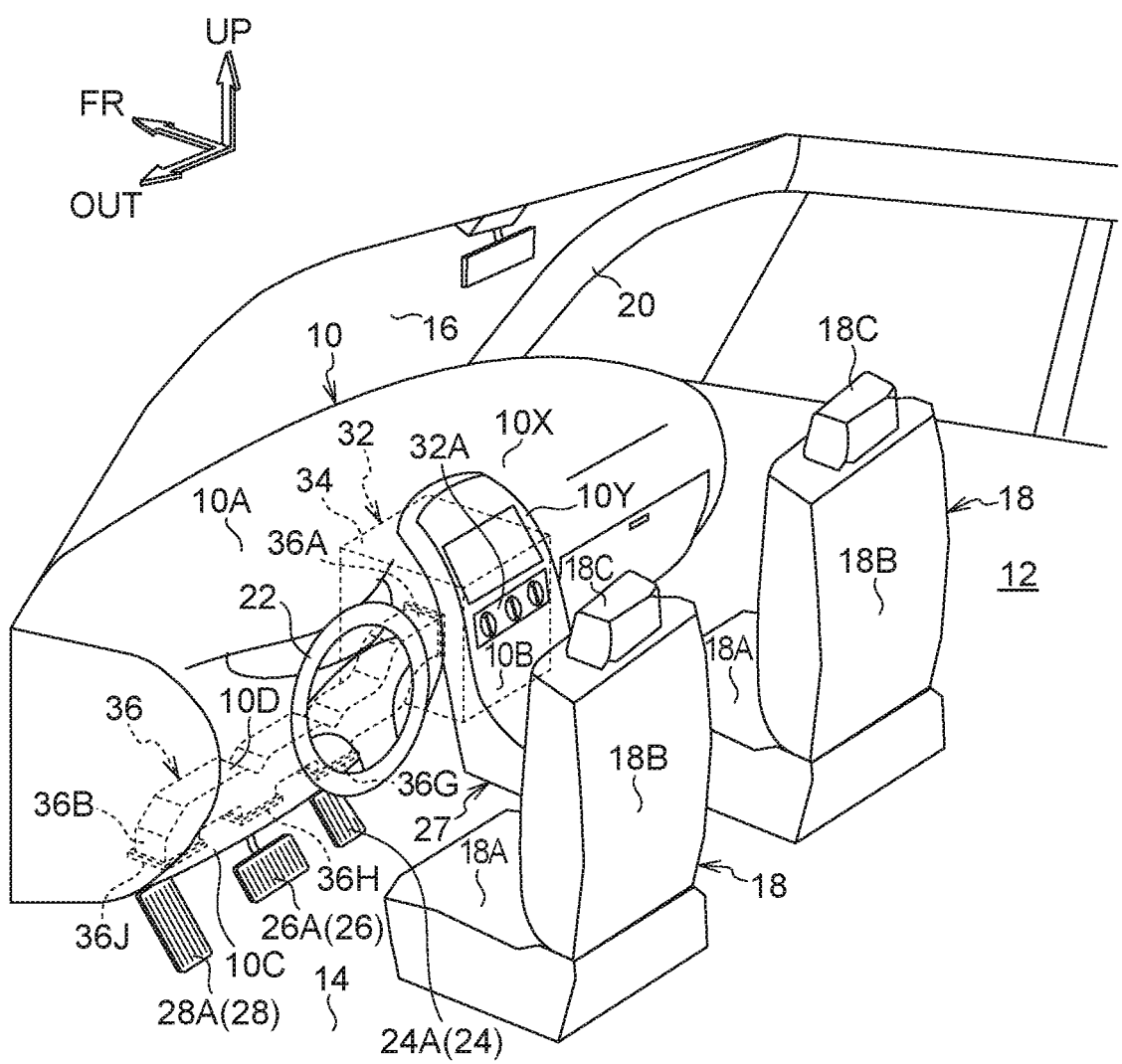
FIG. 1 is a schematic perspective view showing a vehicle cabin interior of a vehicle that includes an air conditioning device for a vehicle according to an exemplary embodiment.

As shown in FIG. 1, an instrument panel 10 is provided at a vehicle cabin front portion. The instrument panel 10 is disposed at an upper portion side of a vehicle rear side of a dash panel, which is not shown in the drawings, that separates a vehicle cabin 12 from a vehicle front portion (not shown in the drawings). A lower end portion of the dash panel is joined to a front end portion of a floor panel 14. The floor panel 14 structures a lower face of the vehicle cabin 12. A cowl, which is not shown in the drawings, is joined to an upper end portion of the dash panel. The cowl supports a lower end portion of a front glass 16. The front glass 16 structures a front face of an upper portion side of the vehicle cabin 12. A lower end portion side of the front glass 16 is disposed at an upper end portion side of the instrument panel 10.

Front seats 18, which serve as vehicle occupant seats of the vehicle, are provided at the vehicle rear side of the instrument panel 10. Of the front seats 18 in the present exemplary embodiment, a front seat at the right side of a front portion of the vehicle cabin 12 serves as a front passenger seat and a front seat at the left side of the front portion of the vehicle cabin 12 serves as a driver seat. A center console 27 is disposed at a vehicle width direction central portion of the front portion side of the vehicle cabin 12. A seat front-and-rear direction of each front seat 18 matches the front-and-rear direction of the vehicle, and a seat width direction of the front seat 18 matches the vehicle width direction. The front seat 18 includes a seat cushion 18A, a seatback 18B of which a lower end is connected to a rear end of the seat cushion 18A, and a headrest 18C that is provided at an upper end of the seatback 18B. Structural parts that support the seat cushion 18A on the floor panel 14 are not shown in the drawings. An upper face portion of the seat cushion 18A serves as a sitting portion for seating of a vehicle occupant. The seat cushion 18A is made slidable in the vehicle front-and-rear direction by a sliding mechanism that is not shown in the drawings.

The instrument panel 10 is structured as an interior furnishing that extends in the vehicle width direction. An instrument panel reinforcement (not shown in the drawings) with a long, narrow shape in the vehicle width direction is disposed at an upper portion of an inner side (the vehicle front side) of the instrument panel 10. The instrument panel 10 is attached to the instrument panel reinforcement at plural locations. The instrument panel reinforcement is a pipe member fabricated of metal, both length direction end portions of which are fixed to vehicle lower sides of a pair of front pillars 20 (left and right framework members, of which only one is shown in the drawings), which are provided upright at left and right vehicle body side portions.

Viewed from the vehicle rear side, a face of the instrument panel 10 that protrudes to the vehicle cabin side thereof is formed in a "T" shape by a first region 10X and a second region 10Y. The first region 10X extends in the vehicle width direction and the second region 10Y depends from a vehicle width direction central portion of the first region 10X. The instrument panel 10 includes an upper wall portion 10A that structures an upper face of the instrument panel 10, a side wall portion 1013 that structures a side face of the second region 10Y, and a bottom wall portion 10C that structures a lower end portion of the instrument panel 10.

Both of vehicle width direction side parts of the instrument, panel 10 are formed in substantial "U" shapes that bulge to the vehicle rear side in side sectional views seen from the vehicle width direction outer sides thereof. Height positions of bulge tip end portions 10D of the two vehicle width direction side parts of the instrument panel 10 are specified to be at the vehicle upper side relative to knee areas (not shown in the drawings) of front scat occupants sitting on the front seats 18. As an example, the instrument panel 10 is a small-thickness structure with a small dimension in the vertical direction at the two vehicle width direction side parts, forming a structure that may assure large spaces for the feet of front seat occupants.

A steering wheel 22 is provided at the driver seat side of the instrument panel 10, via a steering column that is not shown in the drawings. The steering wheel 22 is disposed in a vicinity of the bulge tip end portion 10D at the driver seat side of the instrument panel 10.

An accelerator pedal 24 and a brake pedal 26 serve as control pedals. The accelerator pedal 24, the brake pedal 26 and a footrest 28 are provided at the vehicle lower side of the driver seat side of the instrument panel 10. The accelerator pedal 24 is attached to, for example, the dash panel at the driver seat side, at the second region 10Y side of the instrument panel 10. A tread portion 24A is suspended to the vehicle lower side from the attachment position.

The brake pedal 26 is provided at the vehicle width direction outer side of the accelerator pedal 24. The brake pedal 26 is attached to the dash panel at the driver seat side, and a tread portion 26A of the brake pedal 26 is suspended to the vehicle lower side from this attachment position.

The footrest 28 is provided at the vehicle width direction outer side of the brake pedal 26. The footrest 28 is attached to the dash panel at the driver seat side. A tread portion 28A of the footrest 28, the tread portion 24A of the accelerator pedal 24 and the tread portion 26A of the brake pedal 26 are each angled such that normal directions thereof are oriented to the vehicle upper-rear side.

Figure 4:
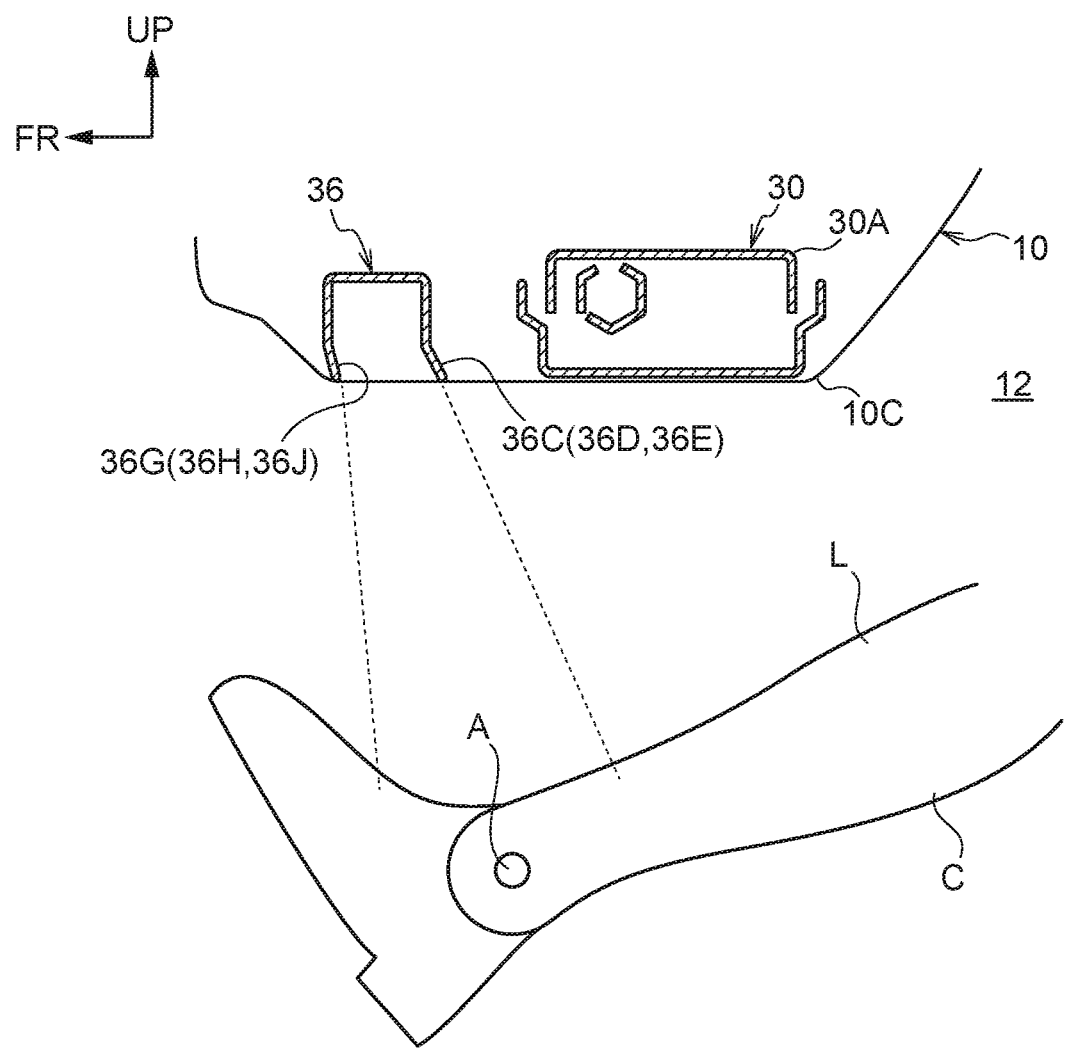
FIG. 4 is a sectional diagram showing a state cut along line A-A in FIG. 3.

As shown in FIG. 4 a knee airbag apparatus 30 is provided at the vehicle lower side of the driver seat side of the interior of the instrument panel 10. The knee airbag apparatus 30 includes a case 30A, an inflator and a knee airbag (neither of which is shown in the drawings). The case 30A is disposed at the bottom all portion 10C side of the instrument panel 10 and is formed in a substantially rectangular box shape whose longest direction is substantially in the vehicle width direction. The inflator and the knee airbag are accommodated inside the case 30A. When activated, the inflator generates gas. The knee airbag is supplied with the gas from the inflator, and inflates and expands toward the vehicle lower side of the interior of the vehicle cabin 12. In side view, the knee airbag apparatus 30 is disposed at the vehicle rear side of the interior of the instrument panel 10; that is, the knee airbag apparatus 30 is disposed at a location close to a leg area L of a vehicle occupant.

—Air Conditioning Device Main Body Portion—

As shown in FIG. 1, an air conditioning device for a vehicle 32 is provided at the inner side (the vehicle front side) of the instrument panel 10. The air conditioning device for a vehicle 32 includes an HVAC (heating, ventilation and air conditioning) unit 34 that serves as an air conditioning device main body portion. The HVAC unit 34 is a unit for providing temperature-regulated air to the interior of the vehicle cabin 12. The basic structure of the HVAC unit 34 is publicly known, for example, in JP-A No. 2010-143374 and the like. Therefore, detailed descriptions of the basic structure are not given here. The HVAC unit 34 is disposed in the interior of a vehicle width direction central portion of the instrument panel 10 and is mounted to the dash panel by fasteners (nuts and bolts) or the like, which are not shown in the drawings.

Operation states of the air conditioning device for a vehicle 32 are controlled from a control panel 32A provided at the second region 10Y of the instrument panel 10. For example, the temperature of air conditioning by the air conditioning device for a vehicle 32, wind amounts, regions toward which air is blown and the like may be controlled from the control panel 32A.

—Foot Duct Main Body Portion—

The air conditioning device for a vehicle 32 includes a foot duct main body portion 36. The foot duct main body portion 36 extends in the vehicle width direction to the vehicle lower side of the driver seat side of the interior of the instrument panel 10. The foot duct main body portion 36 is formed in a substantially square tube shape. The foot duct main body portion 36 is disposed at the vehicle front side relative to the knee airbag apparatus 30 described above (see FIG. 3). One length direction end portion 36A (an end portion at the vehicle width direction inner side) of the foot duct main body portion 36 is connected to a vehicle width direction side face of the HVAC unit 34. The interior of the foot duct main body portion 36 is put into fluid communication with the interior of the HVAC unit 34 by this connection. Another length direction end portion 36B (the end portion at the vehicle width direction outer side) of the foot duct main body portion 36 is disposed at the vehicle upper side of the footrest 28.

—Downward Projecting Portions—

Figure 2:
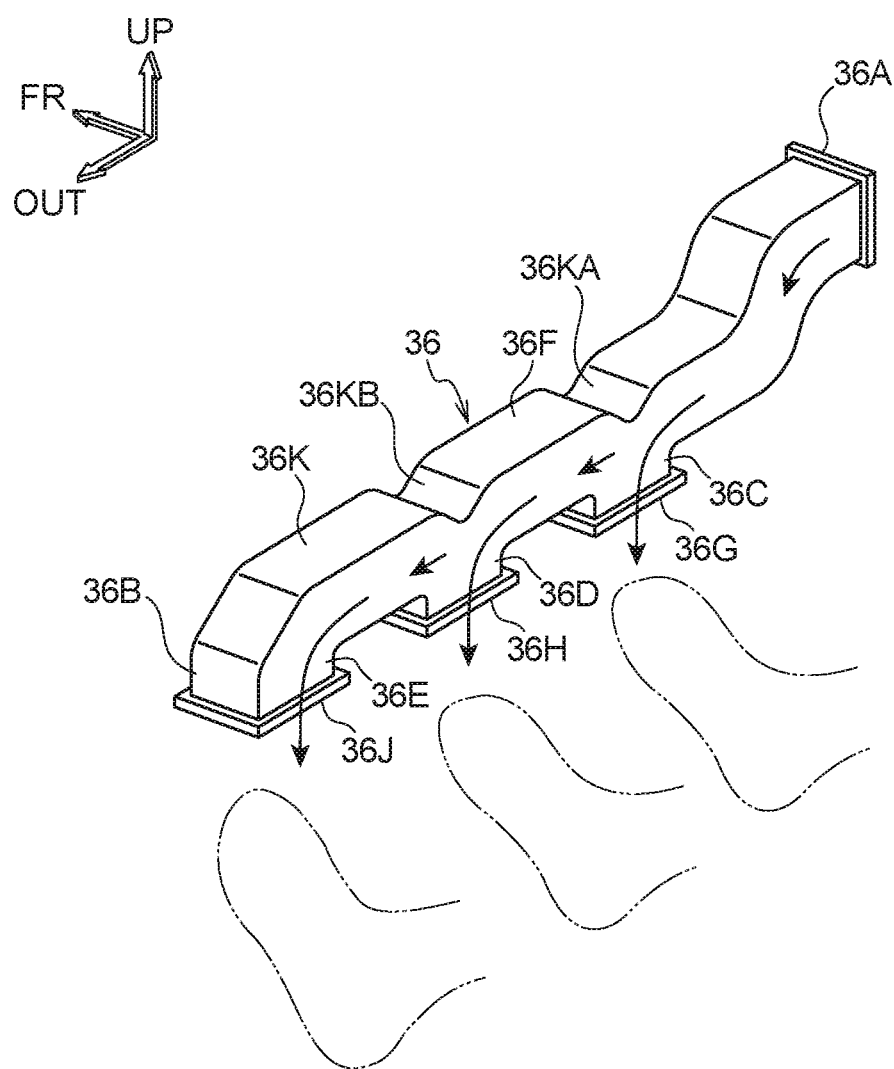
FIG. 2 is a schematic perspective view showing a foot duct main body portion of the air conditioning device for a vehicle according to the exemplary embodiment.
Figure 3:
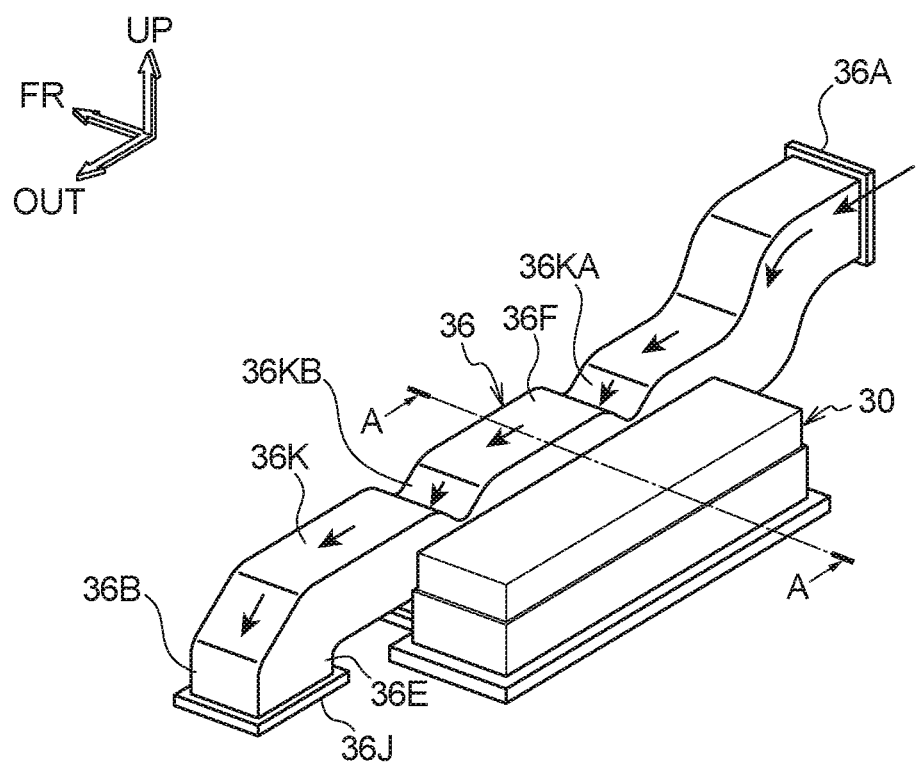
FIG. 3 is a schematic perspective view showing a relationship between the foot duct main body portion of the air conditioning device for a vehicle according to the exemplary embodiment and a knee airbag apparatus.

As shown in FIG. 2, plural downward projecting portions 36C, 36D and 36E are formed at the foot duct main body portion 36. The downward projecting portion 36C is formed in a substantially square tube shape whose interior is in fluid communication with the interior of the foot duct main body portion 36. The downward projecting portion 36C is projected from a vehicle lower side face of the foot duct main body portion 36 toward the vehicle upper side of the accelerator pedal 24 (see FIG. 1). In a vehicle side view, the downward projecting portion 36C is projected diagonally toward the vehicle lower-rear side (see FIG. 4). Thus, the downward projecting portion 36C is formed at a length direction intermediate portion 36F of the foot duct main body portion 36 between the one length direction end portion 36A and the another length direction end portion 36B.

Similarly to the downward projecting portion 36C, the downward projecting portion 36D is formed in a substantially square tube shape whose interior is in fluid communication with the interior of the foot duct main body portion 36. The downward projecting portion 36D is projected from the vehicle lower side face of the foot duct main body portion 36 toward the vehicle upper side of the brake pedal 26 (see FIG. 1). In the vehicle side view, the downward projecting portion 36D is projected diagonally toward the vehicle lower-rear side (see FIG. 4). Thus, the downward projecting portion 36D is formed at the length direction intermediate portion 36F of the foot duct main body portion 36 at the vehicle width direction outer side of the downward projecting portion 36C.

The downward projecting portion 36E is formed in a substantially square tube shape whose interior is in fluid communication with the interior of the foot duct main body portion 36. The downward projecting portion 36E is projected from the vehicle lower side face at the another length direction end portion 36B of the foot duct main body portion 36 toward the vehicle upper side of the footrest 28 (see FIG. 1). In the vehicle side view, the downward projecting portion 36E is projected diagonally toward the vehicle lower-rear side (see FIG. 4).

As shown in FIG. 4, because the downward projecting portions 36C, 36D and 36E are projected diagonally toward the vehicle lower-rear side, side faces at the vehicle front sides and vehicle rear sides of the downward projecting portions 36C, 36D and 36E are each angled to be inclined toward the vehicle lower-rear side relative to side faces at the vehicle front side and vehicle rear side of the foot duct main body portion 36. Angles of inclination of the side faces at the vehicle front sides of the downward projecting portions 36C, 36D and 36E are respectively different from angles of inclination of the side faces at the vehicle rear sides of the same. In the present exemplary embodiment, the angles of the side faces at the vehicle rear sides of the downward projecting portions 36C, 36D and 36E are specified to be greater than the angles of the side faces at the vehicle front sides. As a result, air may be blown out from blowing apertures 36G, 36H and 36J, which are described below, to vicinities of a calf C of a vehicle occupant (see the dotted lines in FIG. 4).

—Blowing Apertures—

The blowing apertures 36G, 36H and 36J are provided in respective end portions at the vehicle lower sides of the downward projecting portions 36C, 36D and 36E. The blowing apertures 36G, 36H and 36J each open toward the vehicle lowerside of the interior of the vehicle cabin 12 (see FIG. 4). Therefore, as shown in FIG. 1, the blowing aperture 36G may blow a portion of air flowing inside the foot duct main body portion 36 out toward the vehicle lower side at the vehicle upper side of the accelerator pedal 24. Similarly, the blowing apertures 36H and 36J may blow portions of the air flowing inside the foot duct main body portion 36 out toward the vehicle lower side at the vehicle upper sides of the brake pedal 26 and the footrest 28. Being formed in the length direction intermediate portion of the foot duct main body portion 36, the blowing apertures 36G and 36H correspond to "intermediate blowing apertures".

—Protruding Portions—

As shown in FIG. 2, protruding portions 36KA and 36KB are formed at regions of a vehicle upper side wall portion 36K of the foot duct main body portion 36 that correspond with, respectively, the blowing, apertures 36G and 36H. In a vehicle front view, the protruding portion 36KA is formed with the midpoint of a region of the vehicle upper side wall portion 36K of the foot duct main body portion 36 that corresponds with a substantially central portion in the vehicle width direction of the blowing aperture 36G protruding toward the vehicle lower side. That is, the protruding portion 36KA is formed substantially in a "V" shape that protrudes toward the vehicle lower side in the vehicle front view.

In the vehicle front view, the protruding, portion 36KB is formed with the midpoint of a region of the vehicle upper side wall portion 36K of the foot duct main body portion 36 that corresponds with a substantially central portion in the vehicle width direction of the blowing aperture 36H protruding toward the vehicle lower side. That is, the protruding portion 36KB is formed substantially in a "V" shape that protrudes toward the vehicle lower side in the vehicle front view. In the present exemplary embodiment, as an example, protrusion amounts of the protruding portion 36KA and the protruding portion 36KB toward the vehicle lower side are specified to be substantially the same as one another.

Although not shown in the drawings, a foot duct main body portion that extends in the vehicle width direction is also provided at the vehicle lower side of the front passenger seat side of the interior of the instrument panel 10. Air from inside the HVAC unit 34 may be blown through blowing apertures formed in this foot duct main body portion toward the foot area of a vehicle occupant sitting on the front passenger seat.

—Operation of the Exemplary Embodiment—

Now, operation of the present exemplary embodiment is described.

In the present exemplary embodiment, as shown in FIG. 1, the foot duct main body portion 36 is provided at the interior of the instrument panel 10. The foot duct main body portion 36 extends substantially in the vehicle width direction and is formed in a substantially tubular shape. The one length direction end portion 36A is connected to the HVAC unit 34, and the blowing aperture 36J is formed at the another length direction end portion 36B. The blowing apertures 36G and 36H are both formed in the length direction intermediate portion of the foot duct main body portion 36. The blowing apertures 36G, 36H and 36J open into the vehicle cabin 12 toward the vehicle lower side thereof. The protruding portions 36KA and 36KB are provided at the regions of the vehicle upper side wall portion 36K of the foot duct main body portion 36 that correspond with the blowing apertures 36G and 36H, and the protruding portions 36KA and 36KB protrude toward the openings of the blowing apertures 36G and 36H. Therefore, portions of air flowing in the foot duct main body portion 36 from the HVAC unit 34 toward the another length direction end portion 36B of the foot duct main body portion 36 blow against each of the protruding portions 36KA and 36KB. The air blowing against the protruding portions 36KA and 36KB is guided by the protruding portions 36KA and 36KB and flows toward the openings of the blowing apertures 36G and 36H. Thus, the air may be efficiently sent to the vehicle cabin interior side through the blowing apertures 36G and 36H. Therefore, air may be efficiently sent toward a vehicle occupant from the blowing apertures 36G and 36H of the duct in which the plural blowing apertures 36G, 36H and 36J are provided.

The blowing, apertures 36G, 36H and 36J are formed in the end portions at the vehicle lower sides of the downward projecting portions 36C, 36D and 36E that are formed in substantially tubular shapes. The downward projecting portions 36C, 36D and 36E are projected toward the vehicle lower-rear side from the foot duct main body portion 36, and the interiors of the downward projecting portions 36C, 36D and 36E are in fluid communication with the interior of the foot duct main body portion 36. Thus, air flowing in the foot duct main body portion 36 can flow into the downward projecting portions 36C, 36D and 36E, and this air is blown out from the blowing apertures 36G, 36H and 36J along the directions of projection of the downward projecting portions 36C, 36D and 36E toward the vehicle lower-rear side of the instrument panel 10. Therefore, as shown in FIG. 4, even if the blowing apertures 36G, 36H and 36J are at a foot of a vehicle occupant sitting to the vehicle rear side of the instrument panel 10, a wind direction may be regulated so as to blow against a vicinity of an ankle A, calf C or the like. Consequently, comfort resulting from the air conditioning may be improved.

The knee airbag apparatus 30 accommodating the knee airbag that inflates and expands toward the vehicle lower side of the interior of the vehicle cabin 12 is mounted at the interior of the instrument panel 10, and the foot duct main body portion 36 is provided at the vehicle front side relative to the knee airbag apparatus 30. That is, the knee airbag apparatus 30 may be provided at a location that is closer to a vehicle occupant. Therefore, a situation in which inflation and expansion of the knee airbag is impeded due to the foot duct main body portion 36 being disposed between the vehicle occupant and the knee airbag apparatus 30 may be suppressed. As a result, safety at a time of vehicle collision may be improved.

Because the blowing aperture 36G, 36H and 36J is disposed at the vehicle upper side of the accelerator pedal 24, brake pedal 26 and footrest 28 provided at the driver seat (see FIG. 1), air may be sent effectively from the HVAC unit 34 to the feet of a vehicle occupant during driving, as shown in FIG. 2. Consequently, comfort resulting from the air conditioning may be further improved.

In the present exemplary embodiment, the foot duct main body portion 36 is disposed at the vehicle front side of the knee airbag apparatus 30, but this is not limiting. The foot duct main body portion 36 may be disposed at the vehicle front side of a fuse box or other equipment. Further, the foot duct main body portion 36 may be disposed at alternative locations at the vehicle rear side of the knee airbag apparatus 30 or the like. In a vehicle in which the knee airbag apparatus 30 is not provided, the foot duct main body portion 36 may be disposed at the vehicle rear side of the interior of the instrument panel 10.

The blowing apertures 36G, 36H and 36J of the foot duct main body portion 36 are disposed at locations that correspond with, respectively, the accelerator pedal 24, the brake pedal 26 and the footrest 28, but this is not limiting. Blowing apertures may be provided at a location corresponding with a region between the accelerator pedal 24 and the brake pedal 26 and a location corresponding with the footrest 28; further alternative structures are possible.

The downward projecting portions 36C, 36D and 36E of the foot duct main body portion 36 are projected diagonally toward the vehicle lower-rear side from the foot duct main body portion 36, but this is not limiting. The downward projecting portions 36C, 36D and 36E may be projected substantially vertically to the vehicle lower side; further alternative structures are possible.

The foot duct main body portion 36 is provided at the vehicle lower side of the interior of the instrument panel 10, but this is not limiting. The foot duct main body portion 36 may be disposed at an alternative location such as the vehicle upper side of the interior of the instrument panel 10 or the like, and the downward projecting portions 36C, 36D and 36E projected substantially to the vehicle lower side therefrom.

The foot duct main body portion 36 extends in the vehicle width direction, but this is not limiting. The foot duct main body portion 36 may extend in an attitude that is angled to some extent in the vehicle vertical direction and/or the vehicle front-and-rear direction.

The foot duct main body portion 36 and the downward projecting portions 36C, 36D and 36E are respectively formed in substantially square tube shapes, but this is not limiting. The same may be formed in alternative shapes such as circular tube shapes and the like.

The downward projecting portions 36C, 36D and 36E are wholly projected diagonally toward the vehicle lower-rear side, but this is not limiting. Only portions at the lower end sides of the downward projecting portions 36C, 36D and 36E may be projected diagonally toward the vehicle lower-rear side, and alternative portions may be projected diagonally toward the vehicle lower-rear side.

Protrusion amounts of the protruding portion 36KA and the protruding portion 36KB to the vehicle lower side are specified to be substantially the same as one another, but this is not limiting. The protrusion amounts may be made different from one another, to alter wind amounts in accordance with frequencies of usage of the control pedals.

An exemplary embodiment of the present disclosure is described hereabove. However, the present disclosure is not limited by these descriptions and it will be clear that numerous modifications beyond these descriptions may be embodied within a technical scope not departing from the gist of the present disclosure.

What is claimed is:

1. An air conditioning device for a vehicle, comprising:
a foot duct main body portion that extends substantially in a vehicle width direction at an interior of an instrument panel, the foot duct main body portion being formed in a substantially tubular shape, one length direction end portion of which is connected to an air conditioning device main body, and blowing apertures that open toward a vehicle lower side of an interior of a vehicle cabin being formed at each of another length direction end portion and a length direction intermediate portion of the foot duct main body portion; and
a protruding portion provided at a region of a vehicle upper side wall portion of the foot duct main body portion, which region corresponds with a blowing aperture formed at the length direction intermediate portion of the foot duct main body portion, the protruding portion protruding toward an opening of the blowing aperture formed at the length direction intermediate portion.

2. The air conditioning device for the vehicle according to claim 1, wherein each of the blowing apertures is formed at a vehicle lower side end portion of a downward projecting portion that is projected toward a vehicle lower-rear side from the foot duct main body portion, the downward projecting portion being formed in a substantially tubular shape, an interior of which is in fluid communication with an interior of the foot duct main body portion.

3. The air conditioning device for the vehicle according to claim 2, wherein angles of inclination of a side face at a vehicle front side and a side face at a vehicle rear side of each downward projecting portion are different angles.

4. The air conditioning device for the vehicle according to claim 2, wherein an angle of inclination of a side face at a vehicle rear side of each downward projecting portion is greater than an angle of inclination of a side face at a vehicle front side of the downward projecting portion.

5. The air conditioning device for the vehicle according to claim 1, wherein;
a knee airbag apparatus is provided at the interior of the instrument panel, a knee airbag that inflates and expands toward the vehicle lower side of the interior of the vehicle cabin being accommodated in the knee airbag apparatus; and
the foot duct main body portion is disposed at a vehicle front side relative to the knee airbag apparatus.

6. The air conditioning device for the vehicle according to claim 1, wherein the blowing apertures are disposed at a vehicle upper side of a control pedal and a footrest that are provided at a driver seat.

7. The air conditioning device for the vehicle according to claim 1, wherein, in a vehicle front view, the protruding portion includes a midpoint of the region of the vehicle upper side wall portion of the foot duct main body portion, which region corresponds with a substantially central portion in the vehicle width direction of the blowing aperture, the midpoint protruding toward the vehicle lower side.

* * * * *